(12) United States Patent
Suzuki et al.

(10) Patent No.: US 8,248,154 B2
(45) Date of Patent: Aug. 21, 2012

(54) CHARGE PUMP CIRCUIT

(75) Inventors: Takanobu Suzuki, Tokyo (JP); Susumu Tanida, Tokyo (JP)

(73) Assignee: Renesas Electronics Corporation, Kanagawa (JP)

(*) Notice: Subject to any disclaimer, the term of this patent is extended or adjusted under 35 U.S.C. 154(b) by 24 days.

(21) Appl. No.: 13/012,311

(22) Filed: Jan. 24, 2011

(65) Prior Publication Data
US 2011/0115552 A1    May 19, 2011

Related U.S. Application Data

(63) Continuation of application No. 12/354,319, filed on Jan. 15, 2009, now Pat. No. 7,902,909.

(30) Foreign Application Priority Data

Mar. 24, 2008 (JP) ................ 2008-075148

(51) Int. Cl.
G05F 1/10 (2006.01)

(52) U.S. Cl. ........................... 327/536

(58) Field of Classification Search ........ 327/390, 327/536, 589
See application file for complete search history.

(56) References Cited

U.S. PATENT DOCUMENTS

| | | | |
|---|---|---|---|
| 5,499,183 A | 3/1996 | Kobatake | |
| 6,091,282 A | 7/2000 | Kim | |
| 6,232,830 B1 * | 5/2001 | Fournel | 327/540 |
| 6,373,325 B1 | 4/2002 | Kuriyama | |
| 6,486,728 B2 * | 11/2002 | Kleveland | 327/536 |
| 6,492,862 B2 * | 12/2002 | Nakahara | 327/536 |
| 6,605,986 B2 | 8/2003 | Tanzawa et al. | |
| 7,439,794 B2 | 10/2008 | Takeyama et al. | |
| 7,557,640 B2 * | 7/2009 | Cheung et al. | 327/536 |
| 7,583,133 B2 * | 9/2009 | Ivanov et al. | 327/536 |

FOREIGN PATENT DOCUMENTS

JP 2005-020971 1/2005

* cited by examiner

Primary Examiner — Hai L Nguyen
(74) Attorney, Agent, or Firm — McDermott Will & Emery LLP

(57) ABSTRACT

There is provided a charge pump circuit which can prevent EMI noise of a frequency component independent of an operation clock frequency from occurring at the time of a change from a disable state to an enable state. The charge pump circuit includes a detection signal synchronization circuit which outputs a synchronization detection signal generated by synchronizing a detection signal outputted from a level detection circuit to a clock signal outputted from an oscillator circuit. The synchronization detection signal is used as a pump enable signal, and a first pump capacitance and a second pump capacitance in a pump circuit body are charged and discharged in response to the synchronization detection signal and the clock signal outputted from the oscillator circuit.

1 Claim, 13 Drawing Sheets

| DET | CLK | DETSYNC |
|---|---|---|
| L | L | L (Reset) |
| L | H | L (Reset) |
| H | L | H or L (Hold) |
| H | H | h (Set) |

CHARGE PUMP CIRCUIT

CROSS-REFERENCE TO RELATED APPLICATIONS

This application is a Continuation of U.S. patent application Ser. No. 12/354,319, filed on Jan. 15, 2009 now U.S. Pat. No. 7,902,909, claiming priority of Japanese Patent Application No. 2008-075148, filed on Mar. 24, 2008, the entire contents of each of which are hereby incorporated by reference.

BACKGROUND OF THE INVENTION

The present invention relates to a charge pump circuit for generating a voltage by charging and discharging capacitors.

A flash memory incorporated in a microcomputer chip uses a high voltage during operation and therefore includes a charge pump circuit to generate a boosted voltage. The operation of the charge pump circuit requires a large current consumption from an external power supply, and electro-magnetic interference (EMI) noise caused by the current consumption is radiated to the outside of the microcomputer chip.

A high level of radiated EMI noise causes interference with devices around the microcomputer chip. Particularly, as for an IC (Integrated Circuit) used in an audio device or the like, caution needs to be exercised so that the frequency band of EMI noise radiated from the microcomputer chip does not overlap with the received frequency band of the audio device. Multiples of the operation clock frequency of the charge pump circuit are dominant in frequency components of EMI noise caused by the operation of the charge pump circuit. Accordingly, the operation clock frequency of the charge pump circuit is set in consideration of a frequency band to be restrained in an environment where the IC is used.

In a power supply circuit disclosed in Japanese Unexamined Patent Publication No. 2005-20971, once a comparator detects an excess of a reference voltage, the comparator output is not switched thereafter within one pulse of a clock signal. This prevents a charge pump from operating at high frequencies and prevents the occurrence of noise.

SUMMARY OF THE INVENTION

In the configuration of a conventional charge pump circuit, there is a duration of an operation asynchronous with a clock signal when the charge pump circuit changes from a disable state to an enable state. In the duration of the operation asynchronous with the clock signal, EMI noise of a frequency component independent of the operation clock frequency of the charge pump circuit occurs. If the frequency component independent of the operation clock frequency falls under a frequency band to be restrained in an environment where the IC is used, there is a problem of causing interference in the operation of the IC.

It is an object of the present invention to provide a charge pump circuit which can prevent EMI noise of a frequency component independent of an operation clock frequency from occurring at the time of a change from a disable state to an enable state.

A charge pump circuit according to the invention includes a charge pump circuit body, including a plurality of charge transfer elements coupled in series and a plurality of capacitive elements each coupled to a coupling path between adjacent charge transfer elements, which boosts an external power supply voltage supplied from an external power supply to the charge transfer elements by charging and discharging adjacent capacitive elements alternately and outputs a boosted voltage higher than the external power supply voltage; a level detection circuit which compares the boosted voltage outputted from the charge pump circuit body with a predetermined reference voltage and outputs a level detection signal according to a comparison result; an oscillator circuit which outputs a clock signal in response to the level detection signal outputted from the level detection circuit; and a detection signal synchronization circuit which outputs a synchronization detection signal generated by synchronizing the level detection signal outputted from the level detection circuit to the clock signal outputted from the oscillator circuit, wherein the capacitive elements in the charge pump circuit body are charged and discharged in response to the clock signal outputted from the oscillator circuit and the synchronization detection signal outputted from the detection signal synchronization circuit.

Further, a charge pump circuit according to the invention includes a plurality of charge pump circuit bodies, including a plurality of charge transfer elements coupled in series and a plurality of capacitive elements each coupled to a coupling path between adjacent charge transfer elements, which boost an external power supply voltage supplied from an external power supply to the charge transfer elements by charging and discharging adjacent capacitive elements alternately and output a boosted voltage higher than the external power supply voltage; a level detection circuit which compares the boosted voltage outputted from the charge pump circuit bodies with a predetermined reference voltage and outputs a level detection signal according to a comparison result; an oscillator circuit which outputs respective clock signals to the charge pump circuit bodies in response to the level detection signal outputted from the level detection circuit; a plurality of detection signal synchronization circuits which one-to-one correspond to the charge pump circuit bodies, the number of detection signal synchronization circuits being the same as the number of charge pump circuit bodies, and output synchronization detection signals generated by synchronizing the level detection signal outputted from the level detection circuit to the respective clock signals outputted from the oscillator circuit to the charge pump circuit bodies, wherein the capacitive elements in the charge pump circuit bodies are charged and discharged in response to the clock signals outputted from the oscillator circuit and the synchronization detection signals outputted from the detection signal synchronization circuits.

According to the charge pump circuit of the invention, the capacitive elements in the charge pump circuit body are charged and discharged in response to the clock signal outputted from the oscillator circuit and the synchronization detection signal outputted from the detection signal synchronization circuit in synchronization with the clock signal. Consequently, it is possible to prevent the capacitive elements from being charged and discharged when the operation of the charge pump circuit body changes from a disable state to an enable state in response to the level detection signal. Accordingly, it is possible to synchronize the operation of the charge pump circuit body to the clock signal, including the change from the disable state to the enable state. Therefore, it is possible to prevent the occurrence of EMI noise of a frequency component which is caused by the operation of the charge pump circuit body asynchronous with the clock signal at the time of the change from the disable state to the enable state and is independent of the operation clock frequency.

According to the charge pump circuit of the invention, in the charge pump circuit bodies, the capacitive elements are charged and discharged in response to the clock signals outputted from the oscillator circuit and the synchronization detection signals outputted from the detection signal synchronization circuits in synchronization with the clock signals. Consequently, it is possible to prevent the capacitive elements from being charged and discharged when the operations of the charge pump circuit bodies change from a disable state to an enable state in response to the level detection signal. Accordingly, it is possible to synchronize the operations of all the charge pump circuit bodies to the clock signals, including the change from the disable state to the enable state. Therefore, it is possible to prevent the occurrence of a consumption current peak caused by pump operations asynchronous with the clock signals at the time of the change from the disable state to the enable state and the occurrence of EMI noise of a frequency component independent of the operation clock frequency.

DESCRIPTION OF THE PREFERRED EMBODIMENTS

<First Premise Technique>

Figure 1:
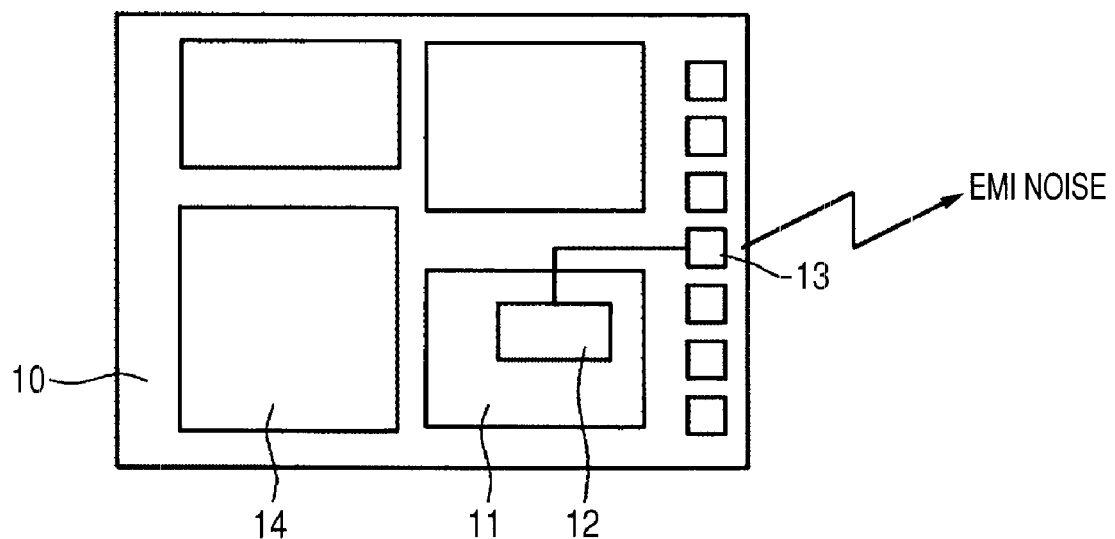
FIG. 1 is a diagram schematically showing a microcomputer chip 10 incorporating a flash memory.

FIG. 1 is a diagram schematically showing a microcomputer chip 10 incorporating a flash memory. The microcomputer chip 10 includes a flash memory 11, a charge pump circuit 12, a power pin 13, and a CPU core 14. The charge pump circuit 12 is provided in the flash memory 11. When the charge pump circuit 12 operates, EMI noise is radiated to the outside of the microcomputer chip 10 from the power pin 13 for supplying a power supply voltage to the charge pump circuit 12.

Since multiples of the operation clock frequency of the charge pump circuit 12 are dominant in frequency components of EMI noise caused by the operation of the charge pump circuit 12 and radiated from the power pin 13, the operation clock frequency of the charge pump circuit 12 is set in consideration of a frequency band to be restrained in an environment where an IC is used.

Figure 2:
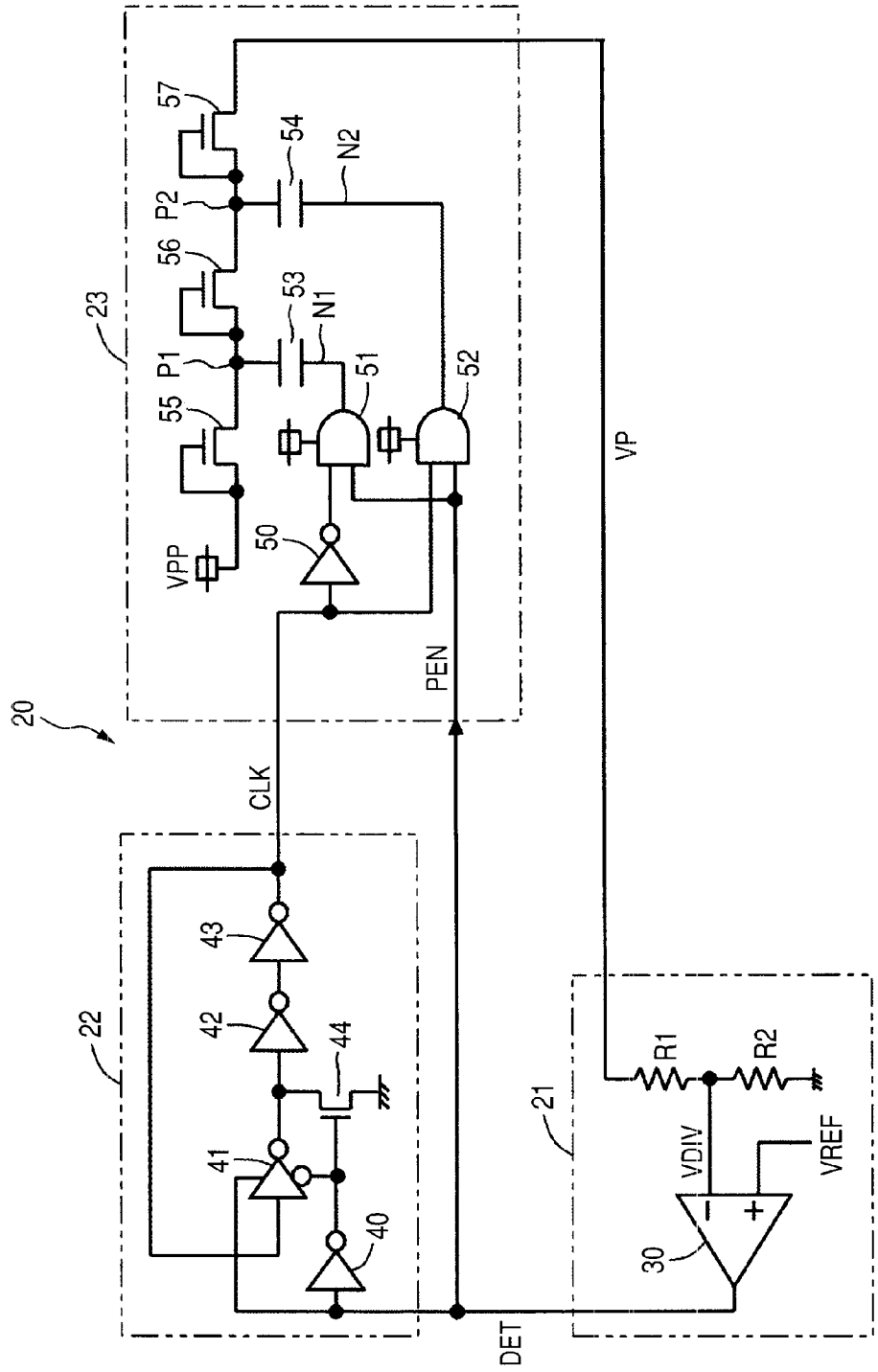
FIG. 2 is a diagram showing the configuration of a charge pump circuit 20 which is a premise for the present invention.

Next, before describing a charge pump circuit according to the present invention, a charge pump circuit 20 which is a premise for the invention will be described. FIG. 2 is a diagram showing the configuration of the charge pump circuit 20 which is a premise for the invention. The charge pump circuit 20 includes a level detection circuit 21, an oscillator circuit 22, and a charge pump circuit body (hereinafter also referred to as a "pump circuit body") 23.

The level detection circuit 21 includes a first resistor R1, a second resistor R2, and an operational amplifier 30. One end of the first resistor R1 is coupled to the pump circuit body 23 described later, and the other end of the first resistor R1 is coupled to one end of the second resistor R2 and the inverting input terminal of the operational amplifier 30. The other end of the second resistor R2 is coupled to a ground. The output terminal of the operational amplifier 30 is coupled to the oscillator circuit 22 and the pump circuit body 23 described later.

A voltage (hereinafter referred to as a "divided voltage") VDIV obtained by dividing a boosted voltage VP generated by the pump circuit body 23 described later at the dividing point between the first resistor R1 and the second resistor R2 is inputted to the inverting input terminal of the operational amplifier 30. A reference voltage VREF is inputted to the non-inverting input terminal of the operational amplifier 30. The operational amplifier 30 compares the divided voltage VDIV with the reference voltage VREF, and outputs a level detection signal (hereinafter also referred to simply as a "detection signal") DET. More specifically, the operational amplifier 30 outputs a signal of a high (H for short) level as a detection signal DET if VREF>VDIV, and outputs a signal of a low (L for short) level as a detection signal DET if VREF≦VDIV. The detection signal DET outputted from the operational amplifier 30 is supplied to the oscillator circuit 22 and the pump circuit body 23 described later.

The oscillator circuit 22 includes a first inverter 40, a second inverter 41, a third inverter 42, a fourth inverter 43, and a MOS transistor 44. The first, third, and fourth inverters 40, 42, and 43 are inverters, and the second inverter 41 is a clocked inverter. In the oscillator circuit 22, the three-stage inverters, i.e., the second to fourth inverters 41 to 43 configure a ring oscillator. In the ring oscillator, the second to fourth inverters 41 to 43 are coupled in series, and the input terminal of the first-stage second inverter 41 is coupled to the output terminal of the third-stage fourth inverter 43. The output terminal of the fourth inverter 43 is coupled to the pump circuit body 23 described later. The MOS transistor 44 is an NMOS transistor.

The first inverter 40 and the first-stage second inverter 41 forming the ring oscillator are coupled to the operational amplifier 30 in the level detection circuit 21. The first inverter 40 is coupled to the gate of the MOS transistor 44 and the first-stage second inverter 41 configuring the ring oscillator. The drain of the MOS transistor 44 is coupled to the coupling point between the second inverter 41 and the third inverter 42, and the source of the MOS transistor 44 is coupled to the ground.

In the oscillator circuit 22, the detection signal DET outputted from the level detection circuit 21 is inputted to the first inverter 40 and the first-stage second inverter 41 configuring the ring oscillator. The detection signal DET functions as an enable signal for the oscillator circuit 22. The inversion signal of the detection signal DET outputted from the first inverter 40 and the output signal of the fourth inverter 43 are inputted to the second inverter 41. The inversion signal of the detection signal DET outputted from the first inverter 40 is inputted to the gate of the MOS transistor 44.

In the oscillator circuit 22, the ring oscillator oscillates at a frequency corresponding to the operation frequency of the pump circuit body 23, and the fourth inverter 43 configuring the ring oscillator outputs a clock signal CLK. The clock signal CLK outputted from the fourth inverter 43 is supplied to the second inverter 41 and the pump circuit body 23.

The pump circuit body 23 has a two-stage configuration, and includes an inverter 50, a first pump driver 51, a second pump driver 52, a first pump capacitance 53, a second pump capacitance 54, a first transfer MOS transistor 55, a second transfer MOS transistor 56, and a third transfer MOS transistor 57. The first and second pump drivers 51 and 52 are AND circuits. The first and second pump capacitances 53 and 54 which are capacitive elements are capacitors. The first to third transfer MOS transistors 55 to 57 which are charge transfer elements are NMOS transistors.

The input terminal of the inverter 50 is coupled to the output terminal of the fourth inverter 43 in the oscillator circuit 22, and the output terminal of the inverter 50 is coupled to an input terminal of the first pump driver 51. An input terminal of the first pump driver 51 is coupled to the output terminal of the operational amplifier 30 in the level detection circuit 21. The output terminal of the first pump driver 51 is coupled to one end of the first pump capacitance 53.

The input terminals of the second pump driver 52 are coupled to the output terminal of the fourth inverter 43 in the oscillator circuit 22 and the output terminal of the operational amplifier 30 in the level detection circuit 21. The output terminal of the second pump driver 52 is coupled to one end of the second pump capacitance 54. An external power supply is coupled to the first and second pump drivers 51 and 52.

In the pump circuit body 23, a plurality of diode-coupled MOS transistors having the gate and drain coupled together (the first to third transfer MOS transistors 55 to 57 in this case) are coupled in series. The drain of the first transfer MOS transistor 55 is coupled to an external power supply VPP. The source of the third transfer MOS transistor 57 is coupled to the first resistor R1 in the level detection circuit 21. The other end of the first pump capacitance 53 is coupled to a first pump node P1, and the other end of the second pump capacitance 54 is coupled to a second pump node P2. The first pump node P1 is the coupling point between the source of the first transfer MOS transistor 55 and the drain of the second transfer MOS transistor 56. The second pump node P2 is the coupling point between the source of the second transfer MOS transistor 56 and the drain of the third transfer MOS transistor 57.

In the pump circuit body 23, the clock signal CLK outputted from the oscillator circuit 22 is inputted to the inverter 50 and the second pump driver 52. The detection signal DET outputted from the level detection circuit 21 is inputted, as a pump enable signal PEN functioning as an enable signal for the pump drivers 51 and 52, to the first and second pump drivers 51 and 52. The first pump driver 51 performs an AND operation of the inversion signal of the clock signal CLK supplied from the inverter 50 and the detection signal DET supplied from the operational amplifier 30 in the level detection circuit 21, and outputs a signal representing the operation result. The second pump driver 52 performs an AND operation of the clock signal CLK supplied from the fourth inverter 43 in the oscillator circuit 22 and the detection signal DET supplied from the operational amplifier 30 in the level detection circuit 21, and outputs a signal representing the operation result.

Thus, in the pump circuit body 23, the first and second pump drivers 51 and 52 charge and discharge the first pump capacitance 53 and the second pump capacitance 54 alternately in synchronization with the clock signal CLK. Accordingly, the first to third transfer MOS transistors 55 to 57 transfer electric charges while boosting voltages from the external power supply VPP, thus generating a boosted voltage VP. The boosted voltage VP generated by the pump circuit body 23 is outputted from the source of the third transfer MOS transistor 57 to the outside of the charge pump circuit 12, and supplied to the level detection circuit 21.

Figure 3:
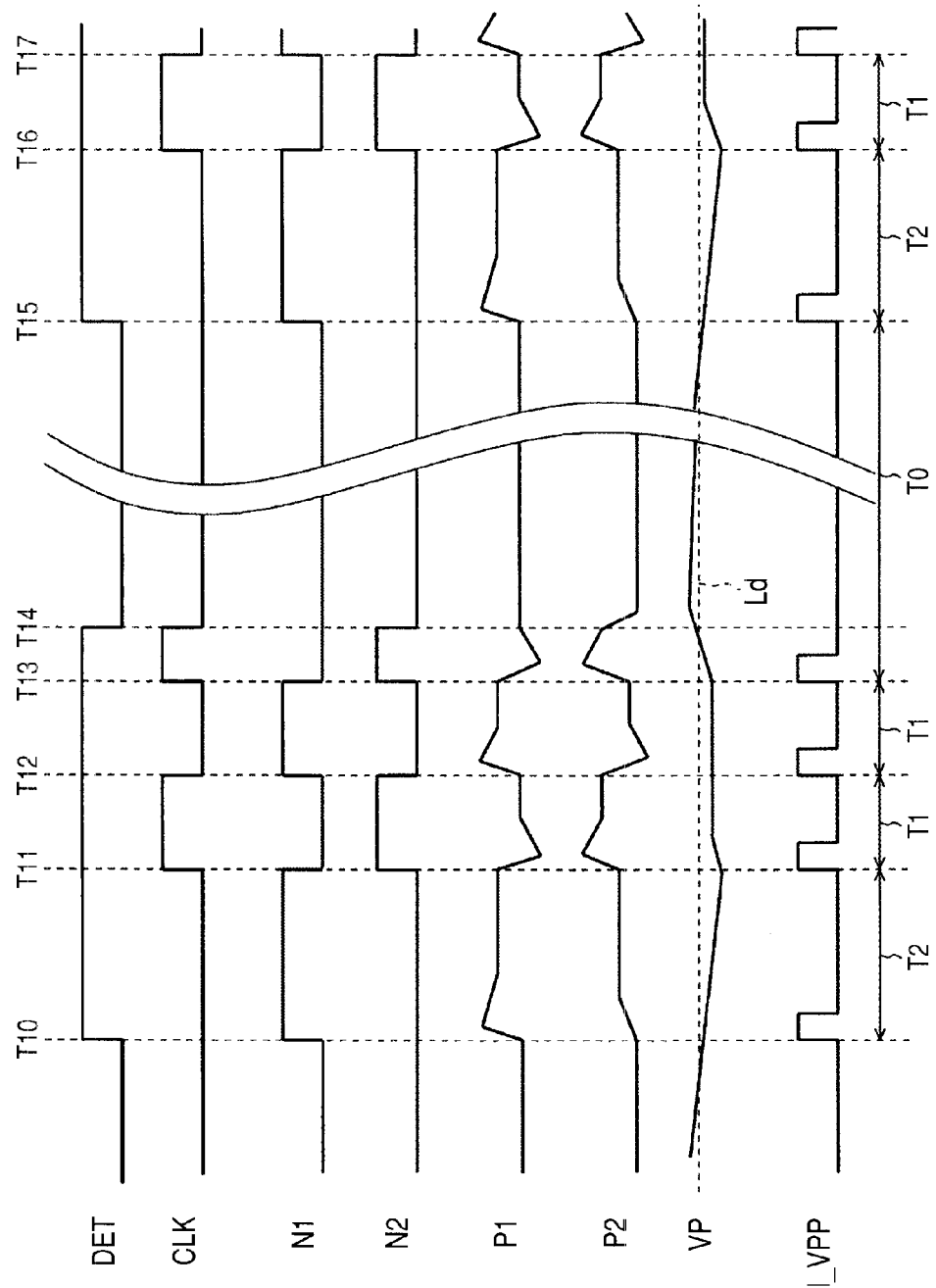
FIG. 3 is a timing chart showing the operation timing of the charge pump circuit 20 shown in FIG. 2.

FIG. 3 is a timing chart showing the operation timing of the charge pump circuit 20 shown in FIG. 2. At a time T10, when the level detection circuit 21 detects that the level of the boosted voltage VP is less than a predetermined detection level Ld, the detection signal DET is enabled, that is, the detection signal DET changes from the L level to the H level. In response thereto, the pump circuit body 23 and the oscillator circuit 22 are enabled. Consequently, in the pump circuit body 23, the output N1 of the first pump driver 51 changes from the L level to the H level, and the level of the first pump node P1 increases. Further, the second transfer MOS transistor 56 is brought into conduction, and electric charges are transferred from the first pump node P1 to the second pump node P2, so that the level of the second pump node P2 increases and the level of the first pump node P1 decreases. There is a delay time T2 from when the oscillator circuit 22 is enabled until when it outputs the clock signal CLK.

At a time T11 after the elapse of the delay time T2 from the time T10, when the clock signal CLK changes from the L level to the H level, the output N2 of the second pump driver 52 changes from the L level to the H level, and the level of the second pump node P2 increases. Further, the third transfer MOS transistor 57 is brought into conduction, and electric charges are transferred from the second pump node P2, so that the level of the boosted voltage VP increases and the level of the second pump node P2 decreases.

Also at the time T11, the output N1 of the first pump driver 51 changes from the H level to the L level, and the level of the first pump node P1 decreases. Further, the first transfer MOS transistor 55 is brought into conduction, and electric charges are transferred from the external power supply VPP to the first pump node P1, so that the level of the first pump node P1 increases.

At a time T12, when the clock signal CLK changes from the H level to the L level, the output N1 of the first pump driver 51 changes from the L level to the H level, and at the same time, the output N2 of the second pump driver 52 changes from the H level to the L level. Further, the level of the first pump node P1 increases, and the level of the second pump node P2 decreases. The second transfer MOS transistor 56 is brought into conduction, and electric charges are transferred from the first pump node P1 to the second pump node P2, so that the level of the second pump node P2 increases and the level of the first pump node P1 decreases. After that, the operations of the times T11 and T12 are repeated until the level of the boosted voltage VP reaches the predetermined detection level Ld.

At a time T14, when the level detection circuit 21 detects that the level of the boosted voltage VP is not less than the predetermined detection level Ld, the detection signal DET is disabled, that is, the detection signal DET changes from the H level to the L level. In response thereto, the pump circuit body 23 and the oscillator circuit 22 are disabled.

The pump circuit body 23 maintains the disable state until the level detection circuit 21 detects at a time T15 that the level of the boosted voltage VP is less than the predetermined detection level Ld. Thus, the pump circuit body 23 repeats the cycle of the enable state and the disable state between the times T10 and T15, thereby generating the desired boosted voltage VP.

Next, description will be made of a consumption current I_VPP of the external power supply VPP in the operation of the pump circuit body 23. The external power supply VPP supplies a large consumption current when the output N1 of the first pump driver 51 or the output N2 of the second pump driver 52 changes from the L level to the H level to charge the first pump capacitance 53 or the second pump capacitance 54. That is, in FIG. 3, pulsed consumption currents I_VPP flow at the times T10 and T15 when the detection signal DET changes from the disable state to the enable state, that is, the detection signal DET changes from the L level to the H level and at the times T11, T12, T13, T16, and T17 when the clock signal CLK changes from the L level to the H level and changes from the H level to the L level.

Figure 4:
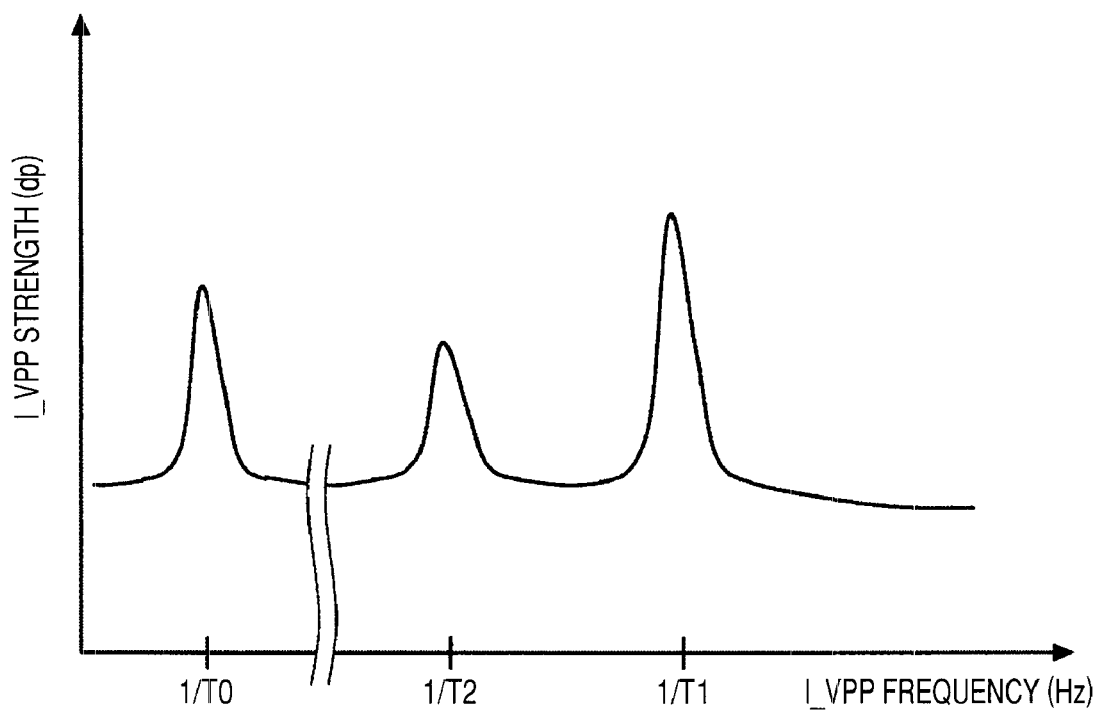
FIG. 4 is a graph showing the relationship between the frequency of the consumption current I_VPP and the strength of the consumption current I_VPP in a pump circuit body 23 shown in FIG. 2.

FIG. 4 is a graph showing the relationship between the frequency of the consumption current I_VPP and the strength of the consumption current I_VPP in the pump circuit body 23 shown in FIG. 2. In the graph, the horizontal axis represents the frequency (Hz) of the consumption current I_VPP, and the vertical axis represents the strength (db) of the consumption current I_VPP. As shown in FIG. 4, the consumption current I_VPP has three strength peaks. The frequency of the highest strength is 1/T1 which is two times the frequency of the clock signal CLK with which the pump circuit body 23 operates. The frequency of the second highest is 1/T0 which stems from an intermission time T0 from when the pump circuit body 23 is disabled until when it is next enabled. The frequency 1/T0 is generally a low frequency. The frequency of the lowest strength is 1/T2 which stems from the time period between the times T10 and T11 and the time period between the times T15 and T16 in FIG. 3, that is, the delay time T2 between the change of the detection signal DET from the disable state to the enable state and the first rising edge of the clock signal CLK. The frequency 1/T2 is a frequency component independent of the operation clock frequency of the pump circuit body 23. If this frequency component falls under a frequency band to be restrained in an environment where an IC is used, there is a problem of causing interference in the operation of the IC.

The frequency component 1/T2 occurs because, at the times T10 and T15 in FIG. 3, the output N1 of the first pump driver 51 changes from the L level to the H level at the same time as the detection signal DET is enabled. That is, at the times T10 and T15, the pump circuit body 23 performs operations asynchronous with the clock signal CLK, which causes the frequency component independent of the clock frequency. For this reason, a configuration shown in FIG. 5 is applied to a charge pump circuit according to the invention.

First Embodiment

Figure 5:
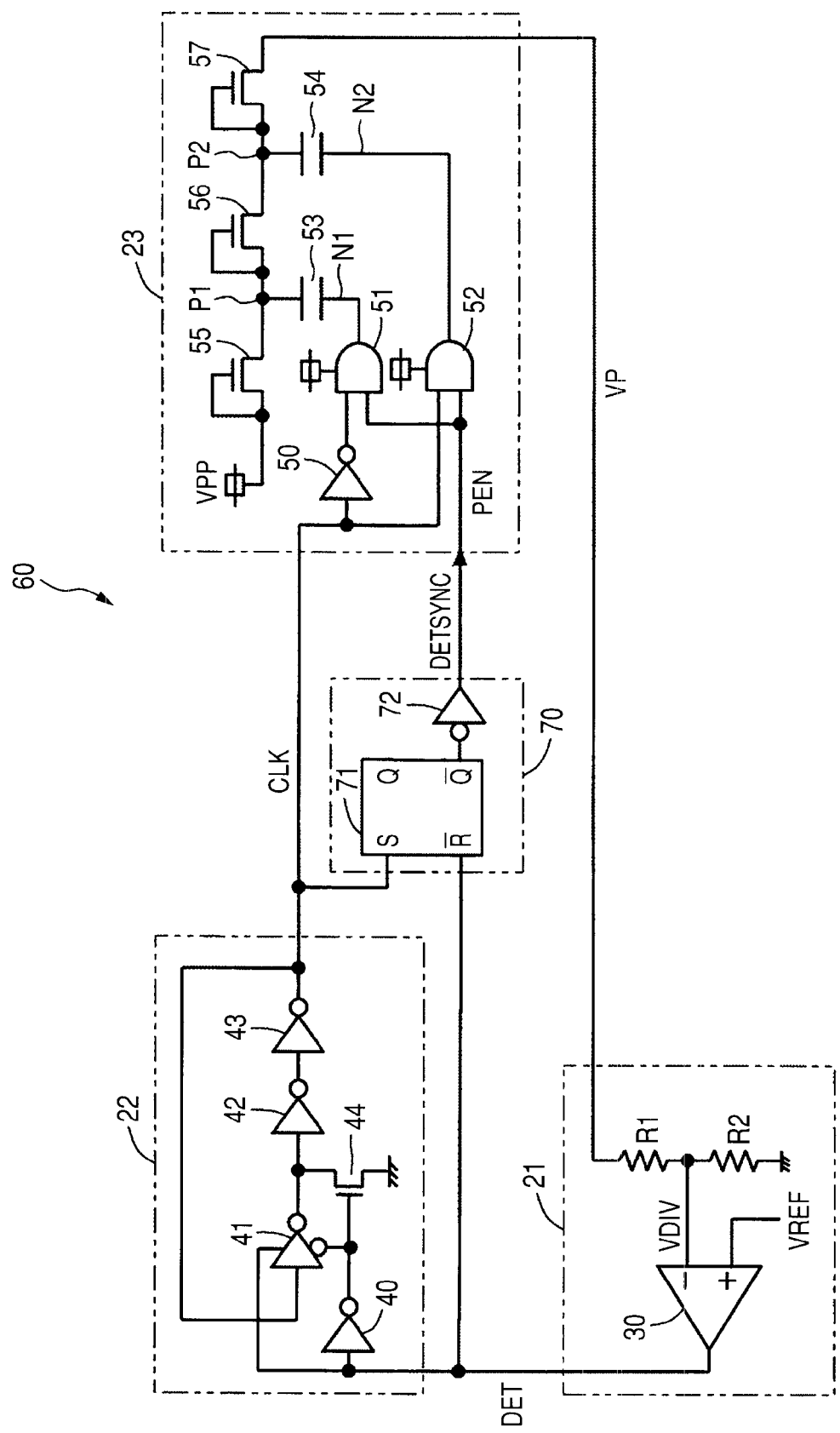
FIG. 5 is a diagram showing the configuration of a charge pump circuit 60 according to a first embodiment of the invention.

FIG. 5 is a diagram showing the configuration of a charge pump circuit 60 according to the first embodiment of the invention. The configuration and function of the charge pump circuit 60 shown in FIG. 5 are similar to those of the charge pump circuit 20 shown in FIG. 2; therefore, only the different sections will be described, and the corresponding sections are denoted by the same reference numerals and will not be described.

The charge pump circuit 60 includes the level detection circuit 21, the oscillator circuit 22, the pump circuit body 23, and a detection signal synchronization circuit 70. The detection signal synchronization circuit 70 includes an RS flip-flop (hereinafter also referred to as an "RSFF") 71 and a synchronization inverter 72. The detection signal synchronization circuit 70 generates, based on the detection signal DET outputted from the level detection circuit 21, a signal (hereinafter referred to as a "synchronization detection signal DETSYNC") in which the enable timing of the pump circuit body 23 is synchronized with the clock signal CLK outputted from the oscillator circuit 22, and supplies the generated synchronization detection signal DETSYNC as a pump enable signal PEN to the pump circuit body 23.

The set terminal S of the RSFF 71 is coupled to the output terminal of the fourth inverter 43 in the oscillator circuit 22 and the coupling point between the input terminal of the inverter 50 and an input terminal of the second pump driver 52 in the pump circuit body 23. The reset terminal /R of the RSFF 71 is coupled to the coupling point between the output terminal of the operational amplifier 30 in the level detection circuit 21 and the input terminal of the first inverter 40 in the oscillator circuit 22. The inverting output terminal /Q of the RSFF 71 is coupled to the input terminal of the synchronization inverter 72. The output terminal of the synchronization inverter 72 is coupled to an input terminal of the second pump driver 52 in the pump circuit body 23.

In the charge pump circuit 20 shown in FIG. 2, the detection signal DET outputted from the operational amplifier 30 in the level detection circuit 21 is inputted, as the pump enable signal PEN, to the first and second pump drivers 51 and 52 in the pump circuit body 23. On the other hand, in the charge pump circuit 60 shown in FIG. 5, the detection signal DET outputted from the operational amplifier 30 in the level detection circuit 21 is inputted to the reset terminal /R of the RSFF 71.

In the charge pump circuit 60, the clock signal CLK outputted from the fourth inverter 43 in the oscillator circuit 22 is inputted to the inverter 50 and the second pump driver 52 in the pump circuit body 23, and is also inputted to the set terminal S of the RSFF 71 in the detection signal synchronization circuit 70.

The logic of a signal outputted from the inverting output terminal /Q of the RSFF 71 in the detection signal synchronization circuit 70 is inverted by the synchronization inverter 72, and the signal obtained by inverting the logic is the synchronization detection signal DETSYNC. The synchronization detection signal DETSYNC is inputted, as a pump enable signal PEN functioning as an enable signal for the pump drivers 51 and 52, to the first and second pump drivers 51 and 52 in the pump circuit body 23.

Figures 6, 7:
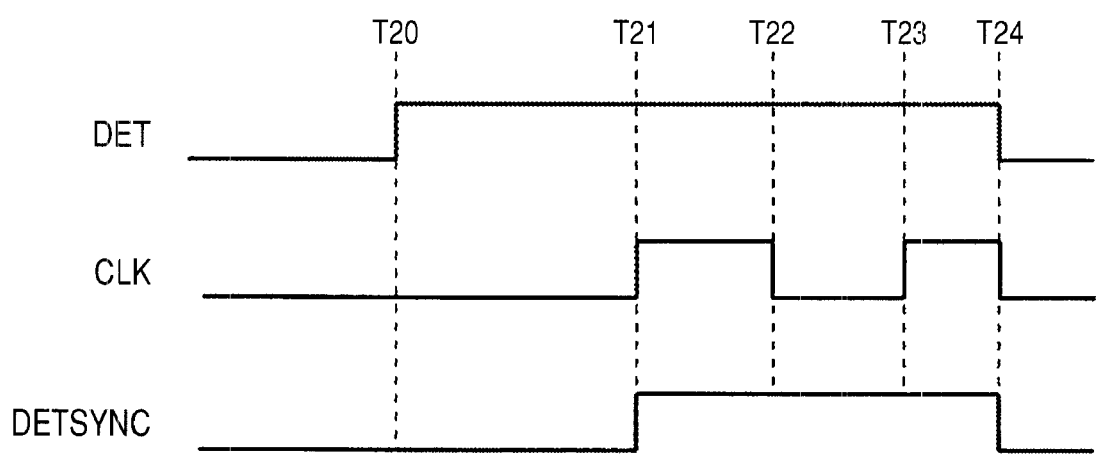
FIG. 6 is a truth table of a detection signal synchronization circuit 70.
FIG. 7 is a timing chart showing the operation timing of the detection signal synchronization circuit 70.

FIG. 6 is a truth table of the detection signal synchronization circuit 70. FIG. 7 is a timing chart showing the operation timing of the detection signal synchronization circuit 70. In the detection signal synchronization circuit 70, if the detection signal DET inputted to the reset terminal /R of the RSFF 71 is at the L level, the synchronization detection signal DETSYNC outputted from the synchronization inverter 72 becomes the L level regardless of the clock signal CLK inputted to the set terminal S of the RSFF 71. If the detection signal DET is at the H level and the clock signal CLK is at the H level, the synchronization detection signal DETSYNC becomes the H level. If the detection signal DET is at the H level and the clock signal CLK is at the L level, the synchronization detection signal DETSYNC holds the preceding state.

Thus, the synchronization detection signal DETSYNC outputted from the detection signal synchronization circuit 70 is generated based on the detection signal DET and the clock signal CLK, in accordance with the truth table shown in FIG. 6. In FIG. 7, on the rising edge of the detection signal DET at a time T20, the clock signal CLK is at the L level; accordingly, the synchronization detection signal DETSYNC holds the preceding state which is the L level. Next, on the rising edge of the clock signal CLK at a time T21, the detection signal DET is at the H level; accordingly, the synchronization detection signal DETSYNC is set to the H level. Further, on the falling edge of the detection signal DET at a time T24, the synchronization detection signal DETSYNC is reset to the L level. As described above, the rising edge of the synchronization detection signal DETSYNC is synchronized with the rising edge of the clock signal CLK.

Figure 8:
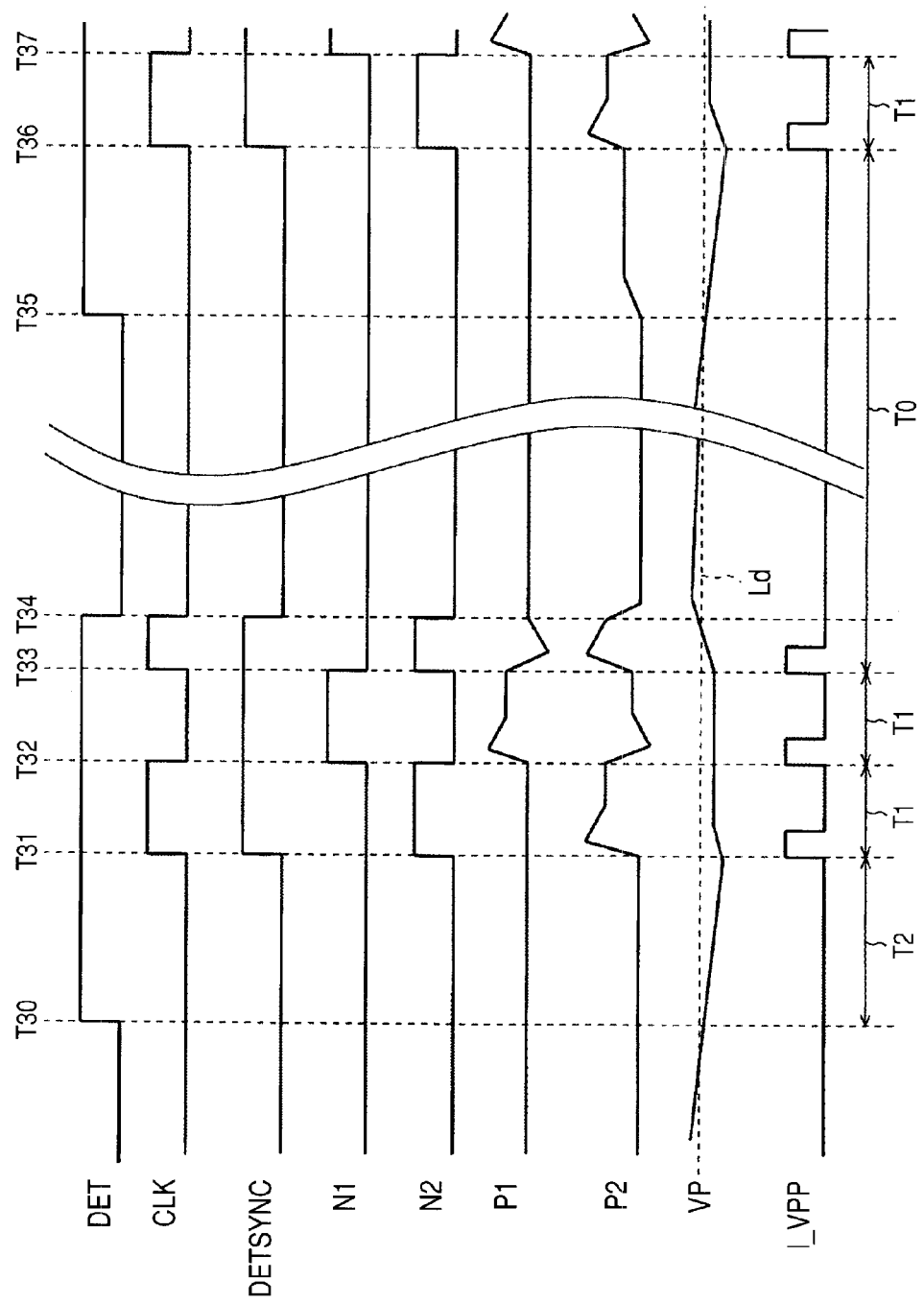
FIG. 8 is a timing chart showing the operation timing of the charge pump circuit 60 shown in FIG. 5.
Figure 9:
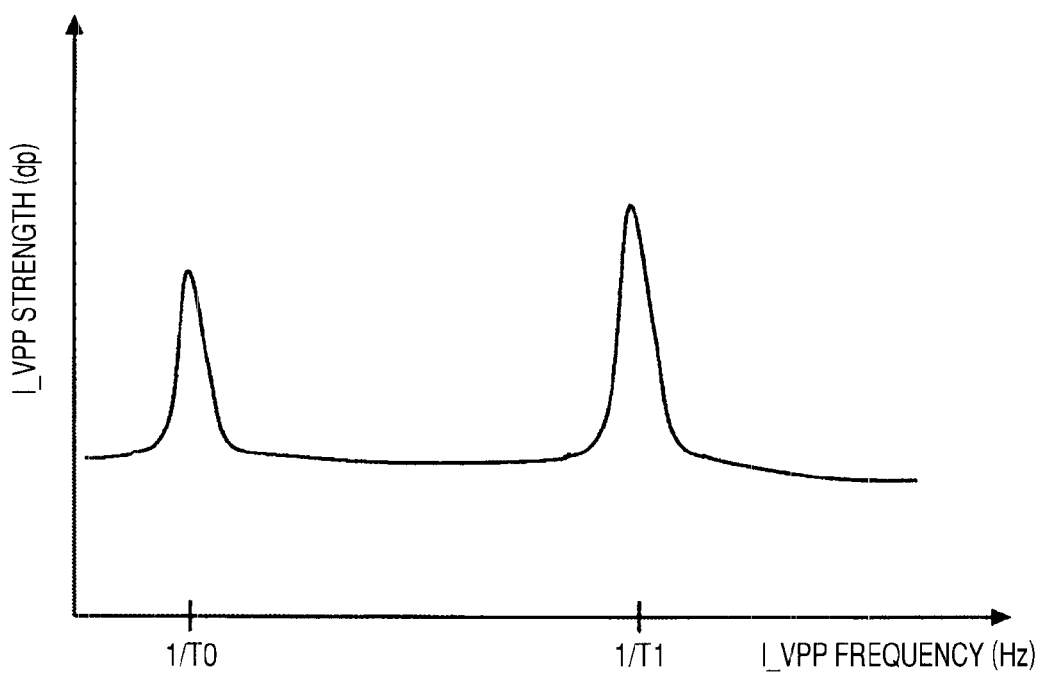
FIG. 9 is a graph showing the relationship between the frequency of the consumption current I_VPP and the strength of the consumption current I_VPP in the pump circuit body 23 shown in FIG. 5.

FIG. 8 is a timing chart showing the operation timing of the charge pump circuit 60 shown in FIG. 5. FIG. 9 is a graph showing the relationship between the frequency of the consumption current I_VPP and the strength of the consumption current I_VPP in the pump circuit body 23 shown in FIG. 5. In the graph, the horizontal axis represents the frequency (Hz) of the consumption current I_VPP, and the vertical axis represents the strength (db) of the consumption current I_VPP.

First, at a time T30, when the level detection circuit 21 detects that the level of the boosted voltage VP is less than the predetermined detection level Ld, the detection signal DET is enabled, that is, the detection signal DET changes from the L level to the H level. In response thereto, the oscillator circuit 22 is enabled. Since the synchronization detection signal DETSYNC outputted from the detection signal synchronization circuit 70 is at the L level, the pump circuit body 23 is not enabled at the time T30.

There is a delay time from when the oscillator circuit 22 is enabled until when it outputs the clock signal CLK. At a time T31, when the clock signal CLK changes from the L level to the H level, the synchronization detection signal DETSYNC changes from the L level to the H level. In response thereto, the pump circuit body 23 is enabled, and thereafter operates in synchronization with the clock signal CLK.

At a time T34, when the level detection circuit 21 detects that the level of the boosted voltage VP is not less than the predetermined detection level Ld, the detection signal DET is disabled, that is, the detection signal DET changes from the H level to the L level, so that the oscillator circuit 22 stops. At the same time, the synchronization detection signal DETSYNC changes from the H level to the L level, so that the pump circuit body 23 is disabled.

The pump circuit body 23 maintains the disable state until the level detection circuit 21 detects at a time T35 that the level of the boosted voltage VP is less than the predetermined detection level Ld.

As described above, in this embodiment, the synchronization detection signal synchronized with the clock signal CLK for pump operation is used as the pump enable signal supplied to the pump circuit body 23. That is, the first pump capacitance 53 and the second pump capacitance 54 in the pump circuit body 23 are charged and discharged in response to the clock signal outputted from the oscillator circuit 22 and the synchronization detection signal outputted from the detection signal synchronization circuit 70 in synchronization with the clock signal.

Consequently, it is possible to prevent the first and second pump capacitances 53 and 54 from being charged and discharged through the first and second pump drivers 51 and 52 when the operation of the pump circuit body 23 changes from the disable state to the enable state in response to the detection signal. Accordingly, it is possible to synchronize the operation of the pump circuit body 23 to the clock signal, including the change from the disable state to the enable state. That is, it is possible to operate the pump circuit body 23 in complete synchronization with the clock signal, including the change from the disable state to the enable state.

Therefore, it is possible to prevent the occurrence of EMI noise of the frequency component which is caused by the operation of the pump circuit body asynchronous with the clock signal at the time of the change from the disable state to the enable state and is independent of the operation clock frequency.

Specifically, as shown in FIG. 8, in the consumption current I_VPP of the external power supply VPP in this embodiment, consumption current pulses which occur at the time of the change from the disable state to the enable state and are asynchronous with the clock signal CLK in the conventional configuration in which the detection signal DET is used as the pump enable signal do not exist, but only consumption current pulses synchronized with the rising and falling edges of the clock signal exist.

Accordingly, as seen in FIG. 9, the strength peaks of I_VPP exist only at the frequency 1/T1 which stems from the frequency of the clock signal CLK and the frequency 1/T0 which stems from the intermission time T0 of the pump, but the frequency component 1/T2 which is conventionally caused by the operation of the pump circuit body asynchronous with the clock signal CLK at the time of the change from the disable state to the enable state does not occur.

Further, in this embodiment, the detection signal synchronization circuit 70 includes the RSFF 71, the level detection signal outputted from the level detection circuit 21 is supplied to the reset terminal /R of the RSFF 71, the clock signal CLK outputted from the oscillator circuit 22 is supplied to the set terminal S, and the synchronization detection signal is outputted from the inverting output terminal /Q. That is, the synchronization detection signal is generated as the inversion signal of the /Q output of the RS flip-flop in which the /R input is the level detection signal outputted from the level detection circuit 21 and the S input is the clock signal outputted from the oscillator circuit 22.

Accordingly, it is possible to achieve the charge pump circuit 60 which can synchronize the operation of the pump circuit body 23 to the clock signal, including the change of the operation of the pump circuit body 23 from the disable state to the enable state in response to the level detection signal.

Further, by using the RSFF 71 as in this embodiment, it is possible to achieve the detection signal synchronization circuit 70 with a smaller number of elements than in the use of a D flip-flop 75 described later, thus making it possible to miniaturize the charge pump circuit 60.

Second Embodiment

Next, a charge pump circuit according to the second embodiment of the invention will be described. The configuration and function of the charge pump circuit according to this embodiment are similar to those of the charge pump circuit 60 shown in FIG. 5; therefore, only the different sections will be described, and the corresponding sections are denoted by the same reference numerals and will not be described.

Figure 10:
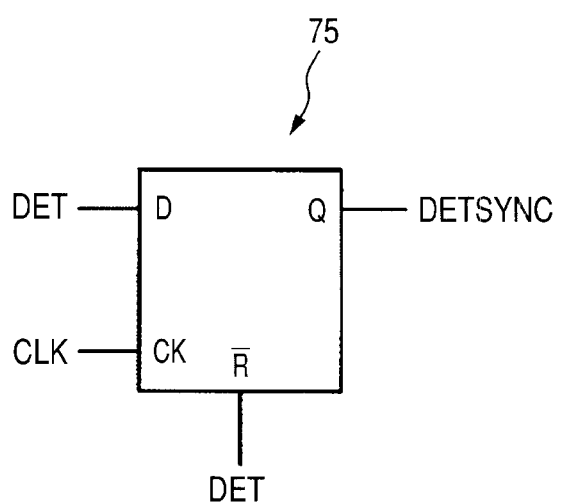
FIG. 10 is a diagram showing a D flip-flop 75.

FIG. 10 is a diagram showing a D flip-flop 75. In the charge pump circuit 60 according to the first embodiment, the detection signal synchronization circuit 70 is configured with the RSFF 71 and the synchronization inverter 72. However, in the charge pump circuit according to this embodiment, the detection signal synchronization circuit is configured with the D flip-flop 75.

The data input terminal D and the reset terminal /R of the D flip-flop (hereinafter also referred to as a "DFF") 75 are coupled to the coupling point between the output terminal of the operational amplifier 30 in the level detection circuit 21 and the input terminal of the first inverter 40 in the oscillator circuit 22. The clock input terminal CK of the DFF 75 is coupled to the output terminal of the fourth inverter 43 in the oscillator circuit 22 and the coupling point between the input terminal of the inverter 50 and an input terminal of the second pump driver 52 in the pump circuit body 23. The output terminal Q of the DFF 75 is coupled to input terminals of the first and second pump drivers 51 and 52 in the pump circuit body 23.

The detection signal DET outputted from the operational amplifier 30 in the level detection circuit 21 is inputted to the data input terminal D and the reset terminal /R of the DFF 75. The clock signal CLK outputted from the fourth inverter 43 in the oscillator circuit 22 is inputted to the clock input terminal CK of the DFF 75. The synchronization detection signal DETSYNC is outputted from the output terminal Q of the DFF 75.

The timing chart of the operation timing of the DFF 75 is the same as that of the detection signal synchronization circuit 70 shown in FIG. 7. Accordingly, also in the case where the detection signal synchronization circuit is configured with the DFF 75, the rising edge of the synchronization detection signal DETSYNC is synchronized with the rising edge of the clock signal CLK, as in the first embodiment.

As described above, in this embodiment, the detection signal synchronization circuit is configured with the DFF 75, the level detection signal outputted from the level detection circuit 21 is supplied to the data input terminal D and the reset terminal /R of the DFF 75, the clock signal CLK outputted from the oscillator circuit 22 is supplied to the clock input terminal CK, and the synchronization detection signal is outputted from the output terminal Q. That is, the synchronization detection signal is generated as the /Q output of the D flip-flop in which the D input and the /R input are the level detection signal outputted from the level detection circuit 21 and the CK input is the clock signal outputted from the oscillator circuit 22. Consequently, it is possible to achieve the charge pump circuit which can synchronize the operation of the pump circuit body 23 to the clock signal, including the change of the operation of the pump circuit body 23 from the disable state to the enable state in response to the level detection signal.

<Second Premise Technique>

To reduce the peak values of the consumption current I_VPP of the external power supply VPP during the operation of the pump circuit body 23 in the above-described embodiment, there is a method of, with a configuration having a plurality of pump circuit bodies 23, operating the pump circuit bodies 23 with clock signals having phases shifted. Before describing a charge pump circuit according to the invention with such a method, a charge pump circuit 80 which is a premise for the invention will be described.

Figure 11:
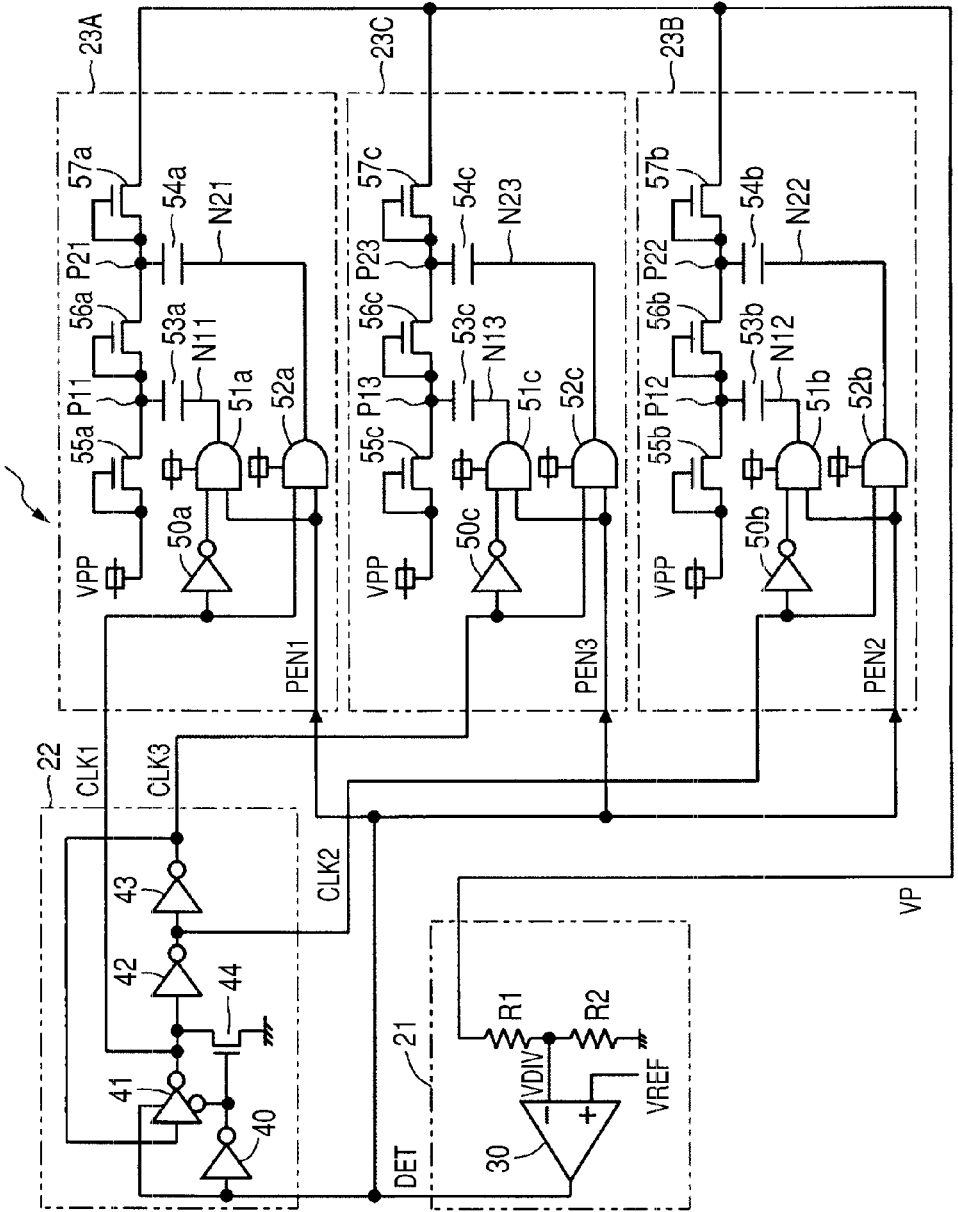
FIG. 11 is a diagram showing the configuration of a charge pump circuit 80 which is a premise for the invention.

FIG. 11 is a diagram showing the configuration of the charge pump circuit 80 which is a premise for the invention. The configuration and function of the charge pump circuit 80 shown in FIG. 11 are similar to those of the charge pump circuit 20 shown in FIG. 2; therefore, only the different sections will be described, and the corresponding sections are denoted by the same reference numerals and will not be described.

The charge pump circuit 80 includes the level detection circuit 21, the oscillator circuit 22, a first pump circuit body 23A, a second pump circuit body 23B, and a third pump circuit body 23C. The first pump circuit body 23A has a two-stage configuration, and includes an inverter 50a, a first pump driver 51a, a second pump driver 52a, a first pump capacitance 53a, a second pump capacitance 54a, a first transfer MOS transistor 55a, a second transfer MOS transistor 56a, and a third transfer MOS transistor 57a. The first and second pump capacitances 53a and 54a which are capacitive elements are capacitors. The first to third transfer MOS transistors 55a to 57a which are charge transfer elements are NMOS transistors.

The first pump circuit body 23B has a two-stage configuration, and includes an inverter 50b, a first pump driver 51b, a second pump driver 52b, a first pump capacitance 53b, a second pump capacitance 54b, a first transfer MOS transistor 55b, a second transfer MOS transistor 56b, and a third transfer MOS transistor 57b. The first and second pump capacitances 53b and 54b which are capacitive elements are capacitors. The first to third transfer MOS transistors 55b to 57b which are charge transfer elements are NMOS transistors.

The first pump circuit body 23C has a two-stage configuration, and includes an inverter 50c, a first pump driver 51c, a second pump driver 52c, a first pump capacitance 53c, a second pump capacitance 54c, a first transfer MOS transistor 55c, a second transfer MOS transistor 56c, and a third transfer MOS transistor 57c. The first and second pump capacitances 53c and 54c which are capacitive elements are capacitors. The first to third transfer MOS transistors 55c to 57c which are charge transfer elements are NMOS transistors.

The inverters 50a to 50c, the first pump drivers 51a to 51c, the second pump drivers 52a to 52c, the first pump capacitances 53a to 53c, the second pump capacitances 54a to 54c, the first transfer MOS transistors 55a to 55c, the second transfer MOS transistors 56a to 56c, and the third transfer MOS transistors 57a to 57c configuring the first to third pump circuit bodies 23A to 23C, function and operate in the same manner as the inverter 50, the first pump driver 51, the second pump driver 52, the first pump capacitance 53, the second pump capacitance 54, the first transfer MOS transistor 55, the second transfer MOS transistor 56, and the third transfer MOS transistor 57 configuring the pump circuit body 23 shown in FIG. 2, respectively.

The output terminal of the second inverter 41 in the oscillator circuit 22 is coupled to the input terminal of the inverter 50a and an input terminal of the second pump driver 52a in the first pump circuit body 23A. The output terminal of the third inverter 42 in the oscillator circuit 22 is coupled to the input terminal of the inverter 50b and an input terminal of the second pump driver 52b in the second pump circuit body 23B. The output terminal of the fourth inverter 43 in the oscillator circuit 22 is coupled to the input terminal of the inverter 50c and an input terminal of the second pump driver 52c in the third pump circuit body 23C.

The output terminal of the operational amplifier 30 in the level detection circuit 21 is coupled to the oscillator circuit 22, and is also coupled to respective input terminals of the first pump drivers 51a to 51c and respective input terminals of the second pump drivers 52a to 52c in the first to third pump circuit bodies 23A to 23C. The respective sources of the third transfer MOS transistors 57a to 57c in the first to third pump circuit bodies 23A to 23C are coupled in common to the first resistor R1 in the level detection circuit 21.

A first clock signal CLK1 is outputted from the output terminal of the second inverter 41 in the oscillator circuit 22, and inputted to the inverter 50a and the second pump driver 52a in the first pump circuit body 23A. A second clock signal CLK2 is outputted from the output terminal of the third inverter 42 in the oscillator circuit 22, and inputted to the inverter 50b and the second pump driver 52b in the second pump circuit body 23B. A third clock signal CLK3 is outputted from the output terminal of the fourth inverter 43 in the oscillator circuit 22, and inputted to the inverter 50c and the second pump driver 52c in the third pump circuit body 23C. The first clock signal CLK1 and the third clock signal CLK3 are in phase, and the second clock signal CLK2 is in opposite phase to the first and third clock signals CLK1 and CLK3.

The detection signal DET outputted from the operational amplifier 30 in the level detection circuit 21 is inputted, as a first pump enable signal PEN1 functioning as an enable signal for the pump drivers 51a and 52a, to the first and second pump drivers 51a and 52a in the first pump circuit body 23A. The detection signal DET outputted from the operational amplifier 30 in the level detection circuit 21 is inputted, as a second pump enable signal PEN2 functioning as an enable signal for the pump drivers 51b and 52b, to the first and second pump drivers 51b and 52b in the second pump circuit body 23B. The detection signal DET outputted from the operational amplifier 30 in the level detection circuit 21 is inputted, as a third pump enable signal PEN3 functioning as an enable signal for the pump drivers 51c and 52c, to the first and second pump drivers 51c and 52c in the third pump circuit body 23C.

The boosted voltage VP generated by the first to third pump circuit bodies 23A to 23C is supplied from the respective sources of the third transfer MOS transistors 57a to 57c in the first to third pump circuit bodies 23A to 23C to the level detection circuit 21.

Figure 12:
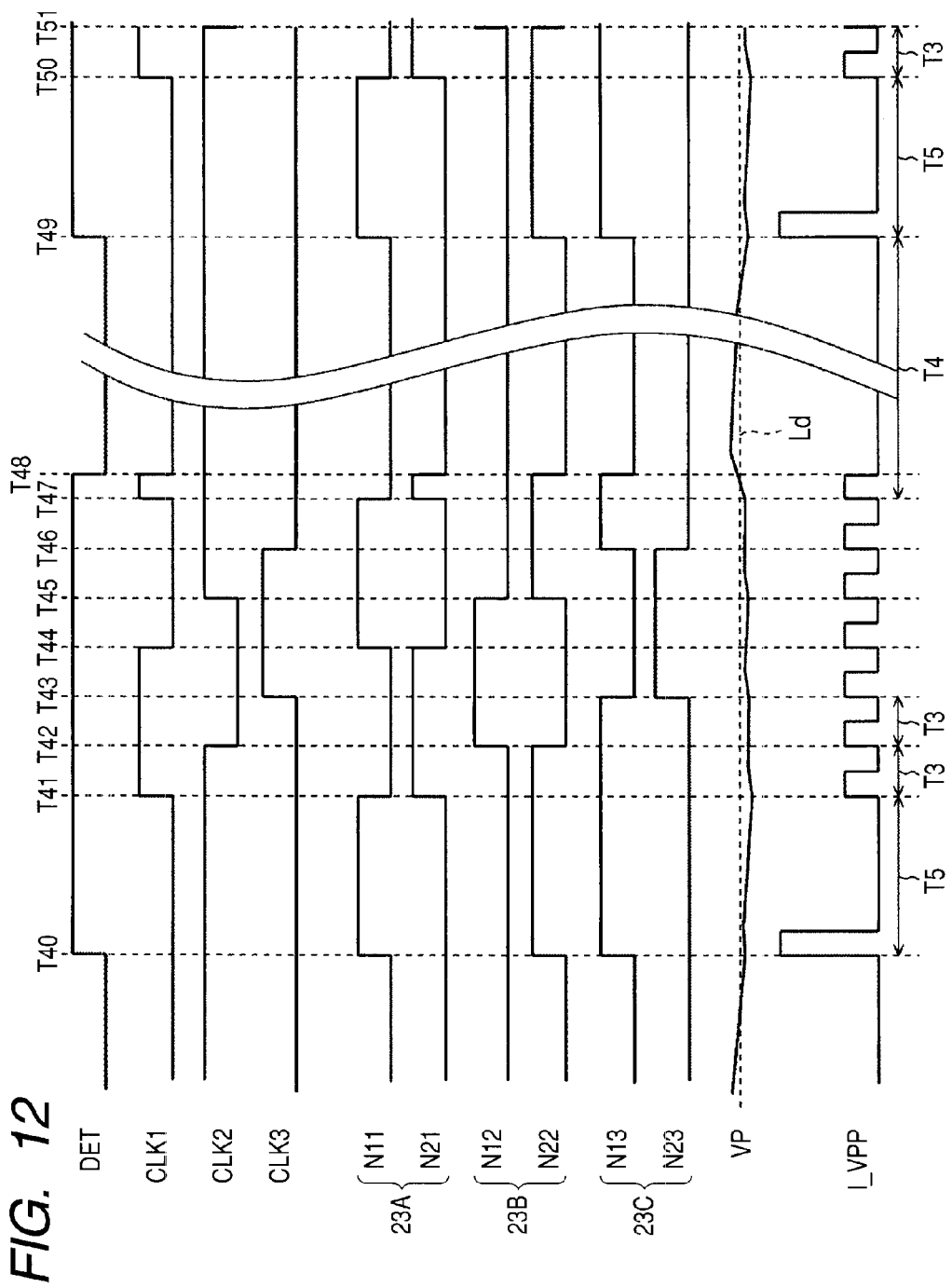
FIG. 12 is a timing chart showing the operation timing of the charge pump circuit 80 shown in FIG. 11.

FIG. 12 is a timing chart showing the operation timing of the charge pump circuit 80 shown in FIG. 11. At a time T40, when the level detection circuit 21 detects that the level of the boosted voltage VP is less than the predetermined detection level Ld, the detection signal DET changes from the disable state to the enable state, that is, the detection signal DET changes from the L level to the H level. In response thereto, the first pump driver 51a in the first pump circuit body 23A, the second pump driver 52b in the second pump circuit body 23B, and the first pump driver 51c in the third pump circuit body 23C operate.

Thus, at the time T40, all the three pump circuit bodies, that is, the first to third pump circuit bodies 23A to 23C operate asynchronously with the first to third clock signals CLK1 to CLK3; accordingly, the strength peak value of the consumption current I_VPP at the time T40 is larger than the strength peak values of the consumption current I_VPP at the time T41 and thereafter. Therefore, there is a problem of not obtaining the effect of reducing the strength peak value of the consumption current I_VPP by having a plurality of pump circuit bodies.

Further, as in the configuration having one pump circuit body, in the consumption current I_VPP, the frequency component which stems from the delay time T5 between the change of the detection signal DET to the enable state and the first rising edge of the clock signal CLK and is independent of the clock signal CLK exists; therefore, there is a problem of causing interference in the operation of the IC.

To solve these problems, although as in the first embodiment the synchronization detection signal DETSYNC in which the enable timing is synchronized with the clock signal CLK can be used as an enable signal for the pump circuit body, it is necessary to use, as enable signals for the pump circuit bodies, synchronization detection signals DETSYNC synchronized with the respective clock signals CLK. For this reason, a configuration shown in FIG. 13 is applied to a charge pump circuit according to the invention.

Third Embodiment

Figure 13:
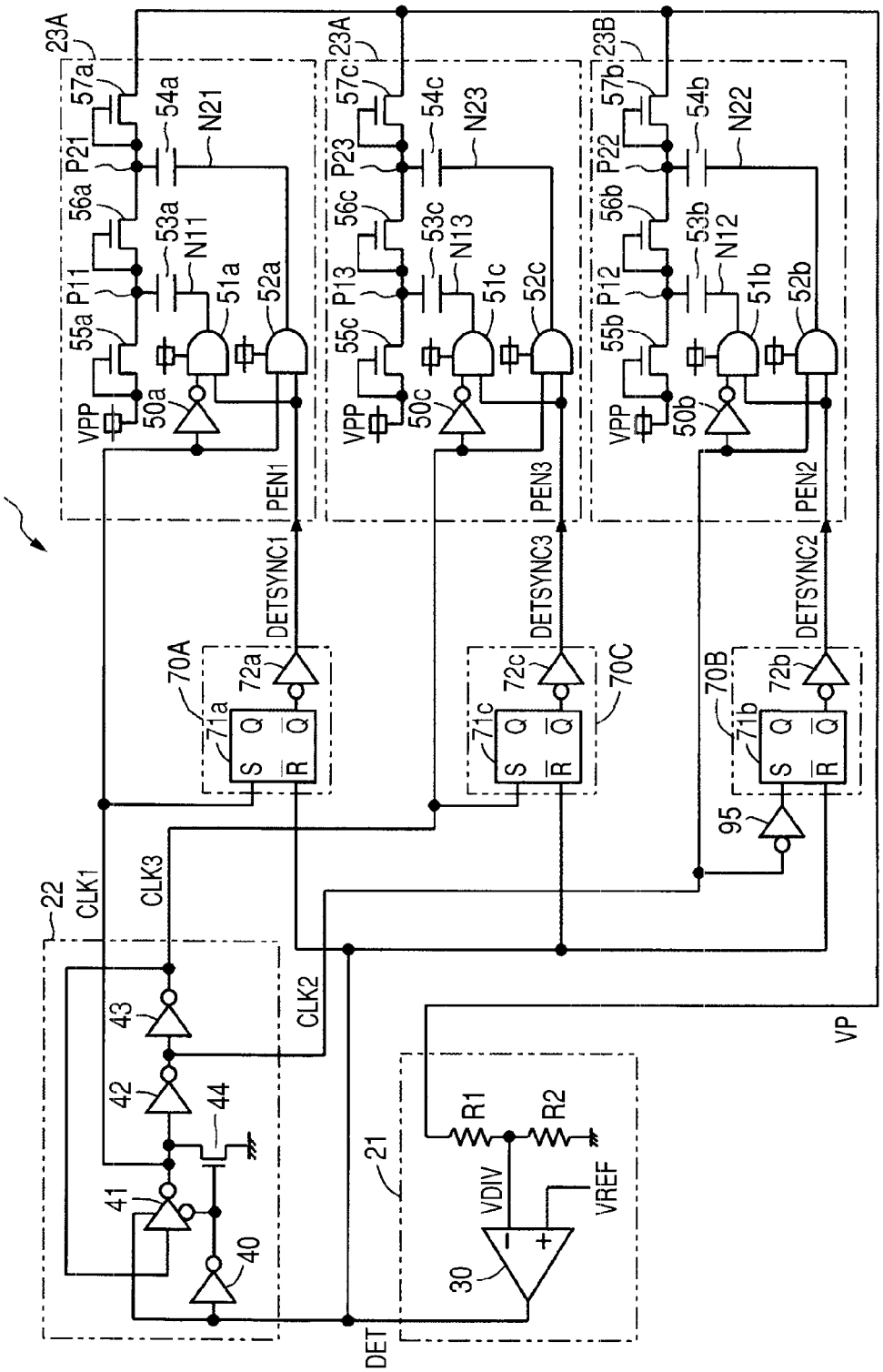
FIG. 13 is a diagram showing the configuration of a charge pump circuit 90 according to a third embodiment of the invention.

FIG. 13 is a diagram showing the configuration of a charge pump circuit 90 according to the third embodiment of the invention. The configuration and function of the charge pump circuit 90 according to this embodiment are similar to those of the charge pump circuit 80 shown in FIG. 11; therefore, only the different sections will be described, and the corresponding sections are denoted by the same reference numerals and will not be described.

The charge pump circuit 90 includes the level detection circuit 21, the oscillator circuit 22, the first pump circuit body 23A, the second pump circuit body 23B, the third pump circuit body 23C, a first detection signal synchronization circuit 70A, a second detection signal synchronization circuit 70B, a third detection signal synchronization circuit 70C, and an inverter 95.

The first detection signal synchronization circuit 70A includes an RSFF 71a and a synchronization inverter 72a. The second detection signal synchronization circuit 70B includes an RSFF 71b and a synchronization inverter 72b. The third detection signal synchronization circuit 70C includes an RSFF 71c and a synchronization inverter 72c.

The RSFFs 71a to 71c and the synchronization inverters 72a to 72c configuring the first to third detection signal synchronization circuits 70A to 70B function and operate in the same manner as the RSFF 71 and the synchronization inverter 72 configuring the detection signal synchronization circuit 70 shown in FIG. 5, respectively.

The set terminal S of the RSFF 71a in the first detection signal synchronization circuit 70A is coupled to the output terminal of the second inverter 41 in the oscillator circuit 22 and the coupling point between the input terminal of the inverter 50a and an input terminal of the second pump driver 52a in the first pump circuit body 23A. The set terminal S of the RSFF 71c in the third detection signal synchronization circuit 70C is coupled to the output terminal of the fourth inverter 43 in the oscillator circuit 22 and the coupling point between the input terminal of the inverter 50c and an input terminal of the second pump driver 52c in the third pump circuit body 23C.

The output terminal of the third inverter 42 in the oscillator circuit 22 and the coupling point between the input terminal of the inverter 50b and an input terminal of the second pump driver 52b in the second pump circuit body 23B are coupled to the input terminal of the inverter 95. The output terminal of the inverter 95 is coupled to the set terminal S of the RSFF 71b in the second detection signal synchronization circuit 70B.

The reset terminals /R of the RSFFs 71a to 71c in the first to third detection signal synchronization circuits 70A to 70C are coupled to the coupling point between the output terminal of the operational amplifier 30 in the level detection circuit 21 and the input terminal of the first inverter 40 in the oscillator circuit 22.

In the charge pump circuit 90, the first clock signal CLK1 outputted from the second inverter 41 in the oscillator circuit 22 is inputted to the inverter 50a and the second pump driver 52a in the first pump circuit body 23A, and is also inputted to the set terminal S of the RSFF 71a in the first detection signal synchronization circuit 70A. The logic of a signal outputted from the inverting output terminal /Q of the RSFF 71a is inverted by the synchronization inverter 72a, and the signal obtained by inverting the logic is a first synchronization detection signal DETSYNC1. The first synchronization detection signal DETSYNC1 is inputted, as a first pump enable signal PEN1 functioning as an enable signal for the pump drivers 51a and 52a, to the first and second pump drivers 51a and 52a in the first pump circuit body 23A.

The third clock signal CLK3 outputted from the fourth inverter 43 in the oscillator circuit 22 is inputted to the inverter 50c and the second pump driver 52c in the third pump circuit body 23C, and is also inputted to the set terminal S of the RSFF 71c in the third detection signal synchronization circuit 70C. The logic of a signal outputted from the inverting output terminal /Q of the RSFF 71c is inverted by the synchronization inverter 72c, and the signal obtained by inverting the logic is a third synchronization detection signal DETSYNC3. The third synchronization detection signal DETSYNC3 is inputted, as a third pump enable signal PEN3 functioning as an enable signal for the pump drivers 51c and 52c, to the first and second pump drivers 51c and 52c in the third pump circuit body 23C.

The second clock signal CLK2 outputted from the third inverter 42 in the oscillator circuit 22 is inputted to the inverter 50b and the second pump driver 52b in the second pump circuit body 23B, and is also inputted to the inverter 95. A signal outputted from the inverter 95 is inputted to the set terminal S of the RSFF 71b in the second detection signal synchronization circuit 70B. The logic of a signal outputted from the inverting output terminal /Q of the RSFF 71b is inverted by the synchronization inverter 72b, and the signal obtained by inverting the logic is a second synchronization detection signal DETSYNC2. The second synchronization detection signal DETSYNC2 is inputted, as a second pump enable signal PEN2 functioning as an enable signal for the pump drivers 51b and 52b, to the first and second pump drivers 51b and 52b in the second pump circuit body 23B.

Figure 14:
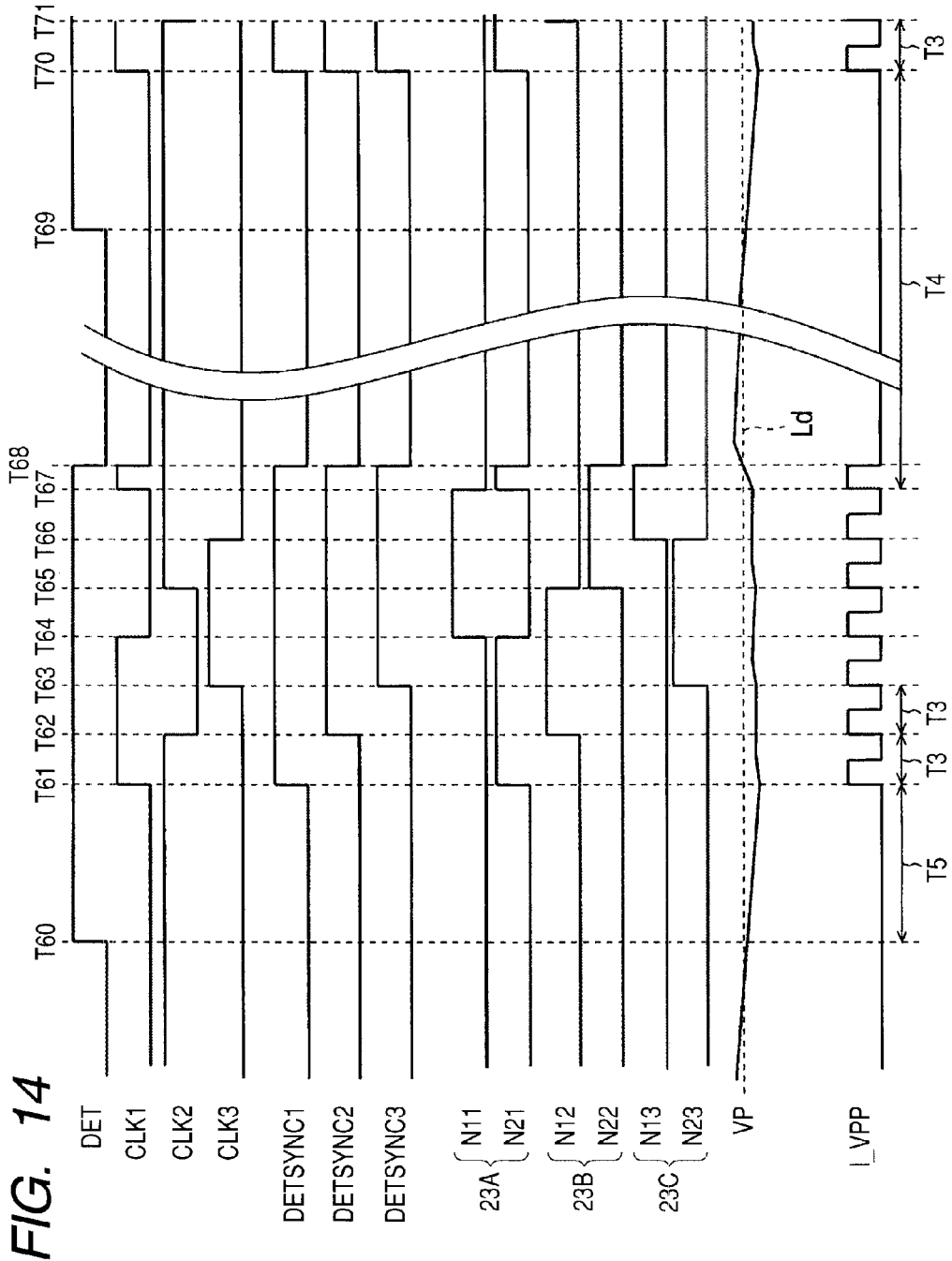
FIG. 14 is a timing chart showing the operation timing of the charge pump circuit 90 shown in FIG. 13.

FIG. 14 is a timing chart showing the operation timing of the charge pump circuit 90 shown in FIG. 13. First, at a time T60, when the level detection circuit 21 detects that the level of the boosted voltage VP is less than the predetermined detection level Ld, the detection signal DET is enabled, that is, the detection signal DET changes from the L level to the H level. In response thereto, the oscillator circuit 22 is enabled. Since the first to third synchronization detection signals DETSYNC1 to DETSYNC3 outputted from the first to third detection signal synchronization circuits 70A to 70C are at the L level, none of the first to third pump circuit bodies 23A to 23C is enabled at the time T60.

There are delay times from when the oscillator circuit 22 is enabled until when it outputs the first to third clock signals CLK1 to CLK3. At a time T61, when the first clock signal CLK1 changes from the L level to the H level, the first synchronization detection signal DETSYNC1 changes from the L level to the H level. In response thereto, the first pump circuit body 23A which operates with the first clock signal CLK1 is enabled, and thereafter operates in synchronization with the first clock signal CLK1.

At a time T62, when the second clock signal CLK2 changes from the H level to the L level, the second synchronization detection signal DETSYNC2 changes from the L level to the H level. In response thereto, the second pump circuit body 23B which operates with the second clock signal CLK2 is enabled, and thereafter operates in synchronization with the second clock signal CLK2.

At a time T63, when the third clock signal CLK3 changes from the L level to the H level, the third synchronization detection signal DETSYNC3 changes from the L level to the H level. In response thereto, the third pump circuit body 23C which operates with the third clock signal CLK3 is enabled, and thereafter operates in synchronization with the third clock signal CLK3.

At a time T68, when the level detection circuit 21 detects that the level of the boosted voltage VP is not less than the predetermined detection level Ld, the detection signal DET is disabled, that is, the detection signal DET changes from the H level to the L level, so that the oscillator circuit 22 stops. At the same time, the first to third synchronization detection signals DETSYNC1 to DETSYNC3 change from the H level to the L level, so that all the pump circuit bodies, that is, the first to third pump circuit bodies 23A to 23C are disabled.

The first to third pump circuit bodies 23A to 23C maintain the disable state until the level detection circuit 21 detects at a time T69 that the level of the boosted voltage VP is less than the predetermined detection level Ld and the detection signal DET is enabled.

Figure 15:
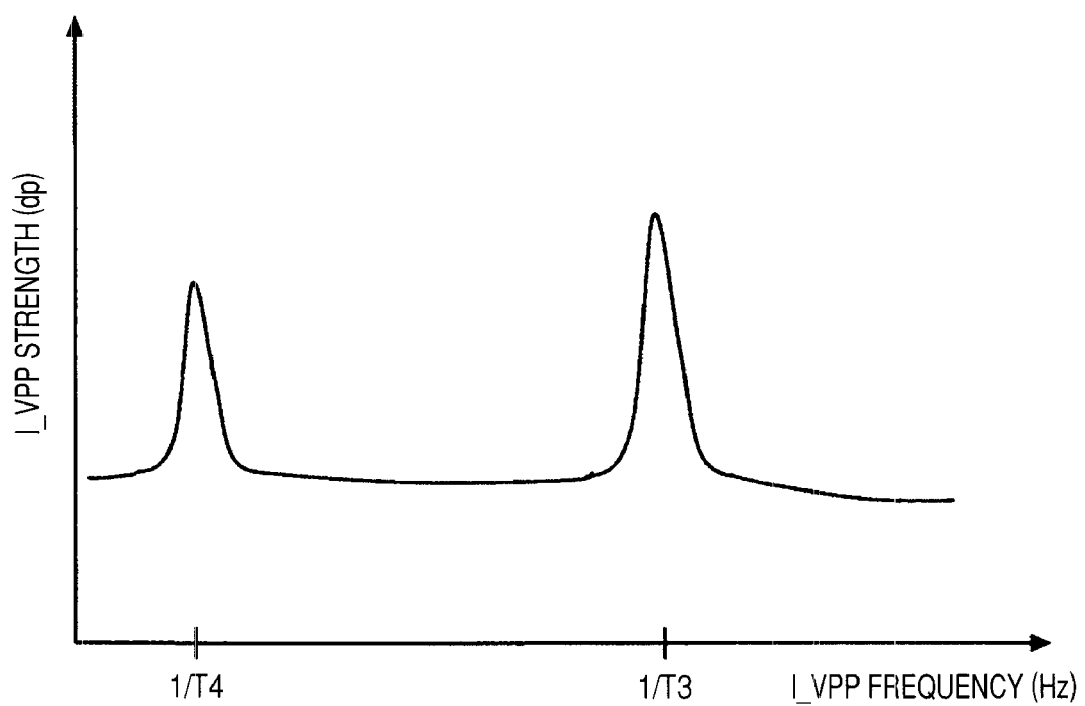
FIG. 15 is a graph showing the relationship between the frequency of the consumption current I_VPP and the strength of the consumption current I_VPP in the first to third pump circuit bodies 23A to 23C shown in FIG. 13.

FIG. 15 is a graph showing the relationship between the frequency of the consumption current I_VPP and the strength of the consumption current I_VPP in the first to third pump circuit bodies 23A to 23C shown in FIG. 13. In the graph, the horizontal axis represents the frequency (Hz) of the consumption current I_VPP, and the vertical axis represents the strength (db) of the consumption current I_VPP. The strength peaks of the consumption current I_VPP exist only at a frequency 1/T3 which stems from the frequency of the first to third clock signals CLK1 to CLK3 and a frequency 1/T4 which stems from the intermission time T4 of the first to third pump circuit bodies 23A to 23C.

Accordingly, a frequency component 1/T5 which is conventionally caused by the operations of the first to third pump circuit bodies 23A to 23C asynchronous with the first to third clock signals CLK1 to CLK3 at the time of the change from the disable state to the enable state does not occur.

As described above, according to this embodiment, in the first to third pump circuit bodies 23A to 23C, the first pump capacitances 53a to 53c and the second pump capacitances 54a to 54c are charged and discharged in response to the clock signals outputted from the oscillator circuit 22 and the synchronization detection signals outputted from the detection signal synchronization circuits 70A to 70C in synchronization with the clock signals. Consequently, it is possible to prevent the first pump capacitances 53a to 53c and the second pump capacitances 54a to 54c from being charged and discharged when the operations of the first to third pump circuit bodies 23A to 23C change from the disable state to the enable state in response to the detection signal. Accordingly, it is possible to synchronize the operations of all the first to third pump circuit bodies 23A to 23C to the clock signals, including the change from the disable state to the enable state.

That is, in the case of operating the divided pump circuit bodies 23A to 23C with clock signals having phases shifted as in this embodiment, by using the synchronization detection signals synchronized with the respective clock signals CLK for the pump circuit bodies 23A to 23C as the pump enable signals for the pump circuit bodies 23A to 23C, it is possible to operate all the pump circuit bodies 23A to 23C in complete synchronization with the clock signals, including the change from the disable state to the enable state.

Therefore, as in the first embodiment, it is possible to prevent the occurrence of the consumption current peak caused by the operations of the pump circuit bodies asynchronous with the clock signals at the time of the change from the disable state to the enable state and the occurrence of EMI noise of the frequency component independent of the operation clock frequency.

Specifically, as shown in FIG. 14, in the consumption current I_VPP of the external power supply VPP in this embodiment, consumption current pulses which occur at the time of the change from the disable state to the enable state and are asynchronous with the clock signals in the conventional configuration in which the detection signal DET is used as the pump enable signal do not exist, but only consumption current pulses synchronized with the rising and falling edges of the clock signals CLK1 to CLK3 exist. Accordingly, it is possible to prevent the occurrence of I_VPP peak which is conventionally caused by the asynchronous operations of the pump circuit bodies at the time of the change from the disable state to the enable state in response to the detection signal.

The above-described embodiments are merely illustrative, and the configurations can be modified within the scope of the invention. For example, in the third embodiment, the first to third detection signal synchronization circuits 70A to 70C are configured with the RSFFs 71a to 71c and the synchronization inverters 72a to 72c. In addition to such a configuration, the first to third detection signal synchronization circuits 70A to 70C may be configured with DFFs 75 shown in FIG. 10. In the case where the first to third detection signal synchronization circuits 70A to 70C are configured with the DFFs 75, the same effect as in the third embodiment can be obtained.

What is claimed is:

1. A charge pump circuit comprising:
   a charge pump circuit body, including a plurality of charge transfer elements coupled in series and a plurality of capacitive elements each coupled to a coupling path between adjacent charge transfer elements, which boosts an external power supply voltage supplied from an external power supply to the charge transfer elements by charging and discharging adjacent capacitive elements alternately and outputs a boosted voltage higher than the external power supply voltage;
   a level detection circuit which compares the boosted voltage outputted from the charge pump circuit body with a predetermined reference voltage and outputs a level detection signal according to a comparison result;
   an oscillator circuit which outputs a clock signal in response to the level detection signal outputted from the level detection circuit; and
   a detection signal synchronization circuit which outputs a synchronization detection signal generated by synchronizing the level detection signal outputted from the level detection circuit to the clock signal outputted from the oscillator circuit,
   wherein the capacitive elements in the charge pump circuit body are charged and discharged in response to the clock signal outputted from the oscillator circuit and the synchronization detection signal outputted from the detection signal synchronization circuit,
   wherein the detection signal synchronization circuit includes a D flip-flop, and
   wherein in the D flip-flop, the level detection signal outputted from the level detection circuit is supplied to a data input terminal and a reset terminal, the clock signal outputted from the oscillator circuit is supplied to a clock input terminal, and the synchronization detection signal is outputted from an output terminal.

* * * * *